(12) United States Patent
Mendler

(10) Patent No.: US 6,848,408 B1
(45) Date of Patent: Feb. 1, 2005

(54) INTAKE PORT

(76) Inventor: Edward Charles Mendler, 7 Millside La., Mill Valley, CA (US) 94941

( * ) Notice: Subject to any disclaimer, the term of this patent is extended or adjusted under 35 U.S.C. 154(b) by 0 days.

(21) Appl. No.: 10/625,262

(22) Filed: Jul. 23, 2003

Related U.S. Application Data

(60) Provisional application No. 60/397,786, filed on Jul. 23, 2002.

(51) Int. Cl.[7] ............................................... F02M 35/10
(52) U.S. Cl. ................................... 123/184.21; 123/308
(58) Field of Search ....................... 123/184.21, 184.42, 123/308, 432, 188.14, 470

(56) References Cited

U.S. PATENT DOCUMENTS

| | | | | |
|---|---|---|---|---|
| 4,271,795 A | * | 6/1981 | Nakagawa et al. | 123/308 |
| 4,742,804 A | * | 5/1988 | Suzuki et al. | 123/256 |
| 4,852,526 A | * | 8/1989 | Brown | 123/184.42 |
| 5,119,794 A | * | 6/1992 | Kushida et al. | 123/549 |
| 5,255,649 A | * | 10/1993 | Isaka | 123/308 |

OTHER PUBLICATIONS

Spoon Sports catalog, p. 14: Spoon Co., Ltd. 1–25–12 Shimotakaido Suginami_Ku Tokyo, Japan.
Blaxill, Hugh, et al.; A Parametric Approach to Spark–Ignition Engine Inlet–Port Design, SAE Technical paper no. 1999–01–0555.
Endres, H. et al.; Influence of Swirl and Tumble on Economy and Emissions, SAE paper No. 920516, Feb. 1992.

* cited by examiner

*Primary Examiner*—Mahmoud Gimie

(57) ABSTRACT

The volumetric efficiency and power of internal combustion engines is improved with an intake port having an intake nozzle, a venturi, and a surge chamber. The venturi is located almost halfway upstream the intake port between the intake valves and the intake plenum enabling the venturi throat diameter to be exceptionally small for providing an exceptionally high ram velocity and an exceptionally long and in turn high efficiency diffuser flowing into the surge chamber. The intake port includes an exceptionally large surge chamber volume for blow down of the intake air into the working cylinder of the engine.

21 Claims, 3 Drawing Sheets

US 6,848,408 B1

INTAKE PORT

PROVISIONAL APPLICATION REFERENCE

This application relates to Provisional Application No. 60/397,786 having a filing date of Jul. 23, 2002.

UNITED STATES GOVERNMENT NOTICE

This invention was made with Government support under Contract No. ANL-2F-00501 awarded by the Department of Energy. The Government has certain rights in this invention.

BACKGROUND OF THE INVENTION

Prior art intake ports a re typically tuned in length and in cross section area to provide either increased torque at a design speed, or a more uniform torque curve through a range of engine speeds. It is common for prior art ports to have a funneled shape, with a minimum cross section area immediately upstream of the intake valve seat(s). The port length provides resonant timings and the small port cross-section area at the outlet of the port acts as a nozzle for providing a high outlet flow velocity. The intake port is defined as the intake flow path from the intake plenum extending downstream to the intake valves.

The ratio of minimum port cross section area just up stream of the intake valve seat(s) to port cross section area at the inlet to the cylinder head (and outlet of the manifold) is typically about 1.0. A smaller port cross section area at the cylinder head inlet and extending down to the valves provides a faster flow velocity due to more nozzling of the flow, but the flow coefficient or port Cd value is generally compromised. Some ports have relatively large cross section area flowing into the cylinder head for more aerodynamic flow and a larger flow coefficient value Cd, however these ports tend to have a lower flow exit velocity due to less nozzling of the flow. The increase in cross section area improves the flow coefficient through the valves at the expense of the ram tuned exit velocity.

Venturi gaskets have been sold in the aftermarket by Spoon Sports in Japan and their distributors in the United States that significantly reduce port cross section area at the cylinder head inlet. The se venturi gaskets can modestly increase engine torque in engines that do not have very good port flow to begin with. In a typical application, torque is modestly improved in an area where torque is low to begin with, and maximum torque is no better or not significantly better than a well-designed conventional port. The venturi gaskets provide very little benefit for engines that have good port flow to begin with. With these venturi gaskets, the volume inside of the port down stream of the intake manifold is relatively small. The venturi is located between the intake manifold and cylinder head a short distance from the intake valves, and consequently the divergent nozzle is short and abrupt. The short nozzle length causes a sudden expansion of the flow and inefficient diffusion and pressure recovery.

SUMMARY OF THE INVENTION

According to the present invention, the intake port of a reciprocating piston internal combustion engine includes a venturi located almost halfway upstream the intake port between the intake valves and intake plenum, for providing a high flow velocity ram effect; a large lower port head volume for providing highly aerodynamic flow through the intake valve(s) into the working cylinder; and a high efficiency diffuser for converting the high speed flow from the venturi into elevated gas pressure with minimal losses.

The very small venturi throat or nozzle area plus tuning of the port upstream of the venturi provides an exceptionally high flow velocity through the nozzle. The long diffuser downstream of the venturi efficiently converts the high-speed flow into elevated gas pressure. The large low er head volume holds the pressurized intake air for blow down through the intake valve(s) into the working cylinder. The large cross section area of the head also enables an exceptionally high port flow coefficient Cd to be attained. The venturi is located far upstream to provide a large head volume plus port length needed for providing a high efficiency diffuser. Placing the venture far upstream permits the venturi nozzle area to be exceptionally small and in turn the ram velocity exceptionally high. The combination of exceptionally high ram velocity, high efficiency diffusion, large head volume, and high flow coefficient Cd values made possible by the large head cross section area provides an exceptionally high volumetric efficiency and in turn exceptionally high engine torque levels. Torque is significantly improved throughout the engine's full operating speed range in most embodiments of the present invention.

DETAILED DESCRIPTION OF THE PREFERRED EMBODIMENTS

Figure 1:
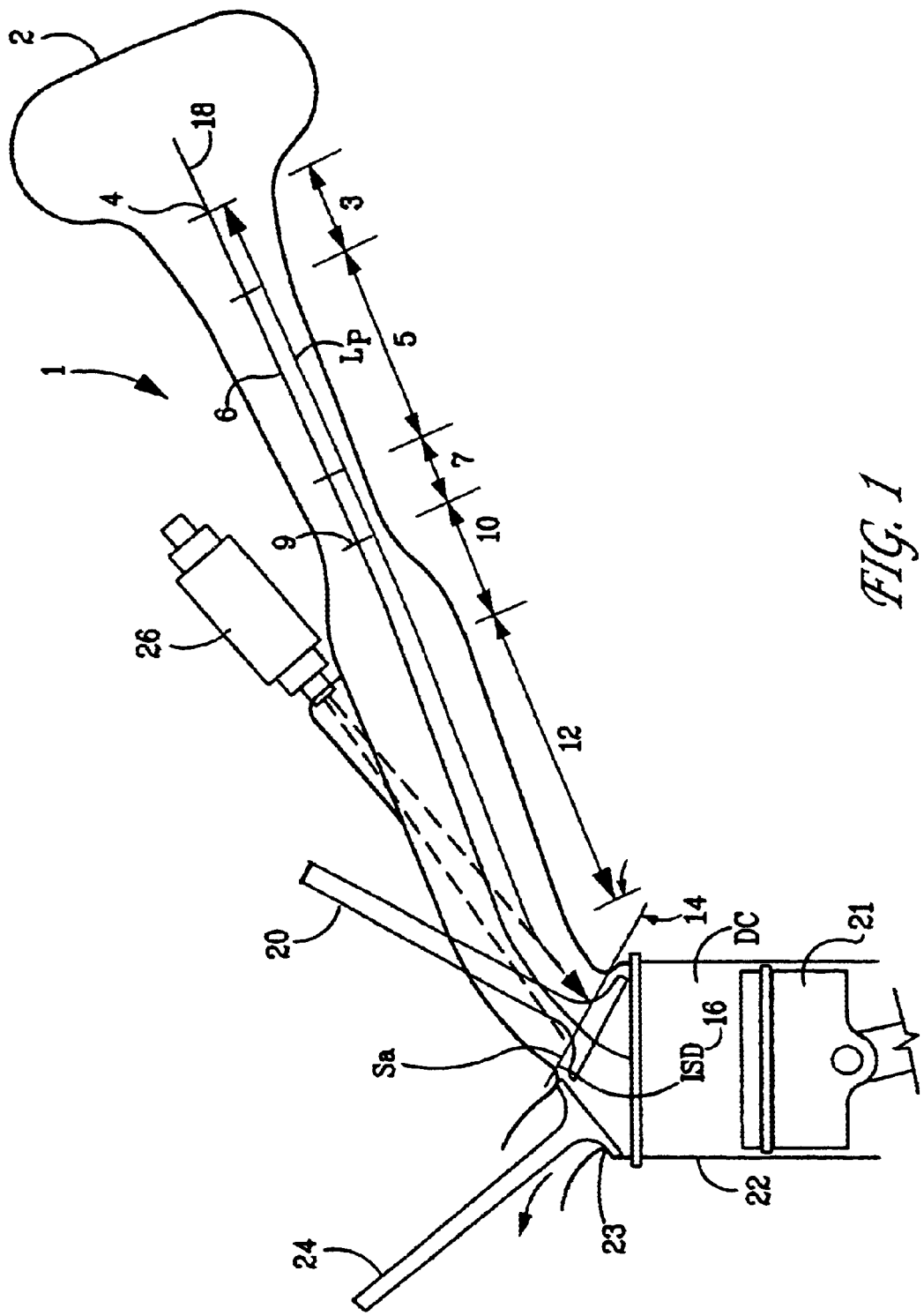
FIG. 1 is intended to illustrate a sectional view of an intake port according to the present invention.

FIG. 1 is intended to illustrate an intake port 1 according to the present invention having an intake plenum 2, an inlet funnel 3 and a port inlet 4, a ram tuning pipe 5, a ram nozzle 7 having a venturi throat 9, a diffuser 10, a surge chamber 12, and a outlet nozzle 14, having a inner seat diameter or ISD 16 at its outlet. The port further includes a flow centerline 18. The port is preferably attached to the combustion chamber and working cylinder of a 4-stroke internal combustion engine 22, having one or more intake valves 20 per cylinder and one or more exhaust valves per cylinder 24 per cylinder mounted in a cylinder head 23. A piston 21 is mounted in cylinder 22 for reciprocating motion within the cylinder. The reciprocating piston in the cylinder defines a swept cylinder displacement Dc equal to the cross section area of cylinder 22 times the stroke of the piston. The intake port may optionally include one or more fuel injectors 26.

The in take port is defied as the intake flow path from the intake plenum extending downstream to the intake valves. Technical literature commonly refers to the intake port as the part of the flow path situated in the cylinder head, and the intake runner as the part of the flow path situated in the intake manifold that extends from the intake plenum downstream to the cylinder head inlet. This prior definition is based on the intake manifold to cylinder head parting line, which has an arbitrary location relative to the gas path aerodynamics. This common definition of port is not used in the present specification, and instead the intake port is defined as the full intake flow path from intake plenum to intake valves.

Figure 2:
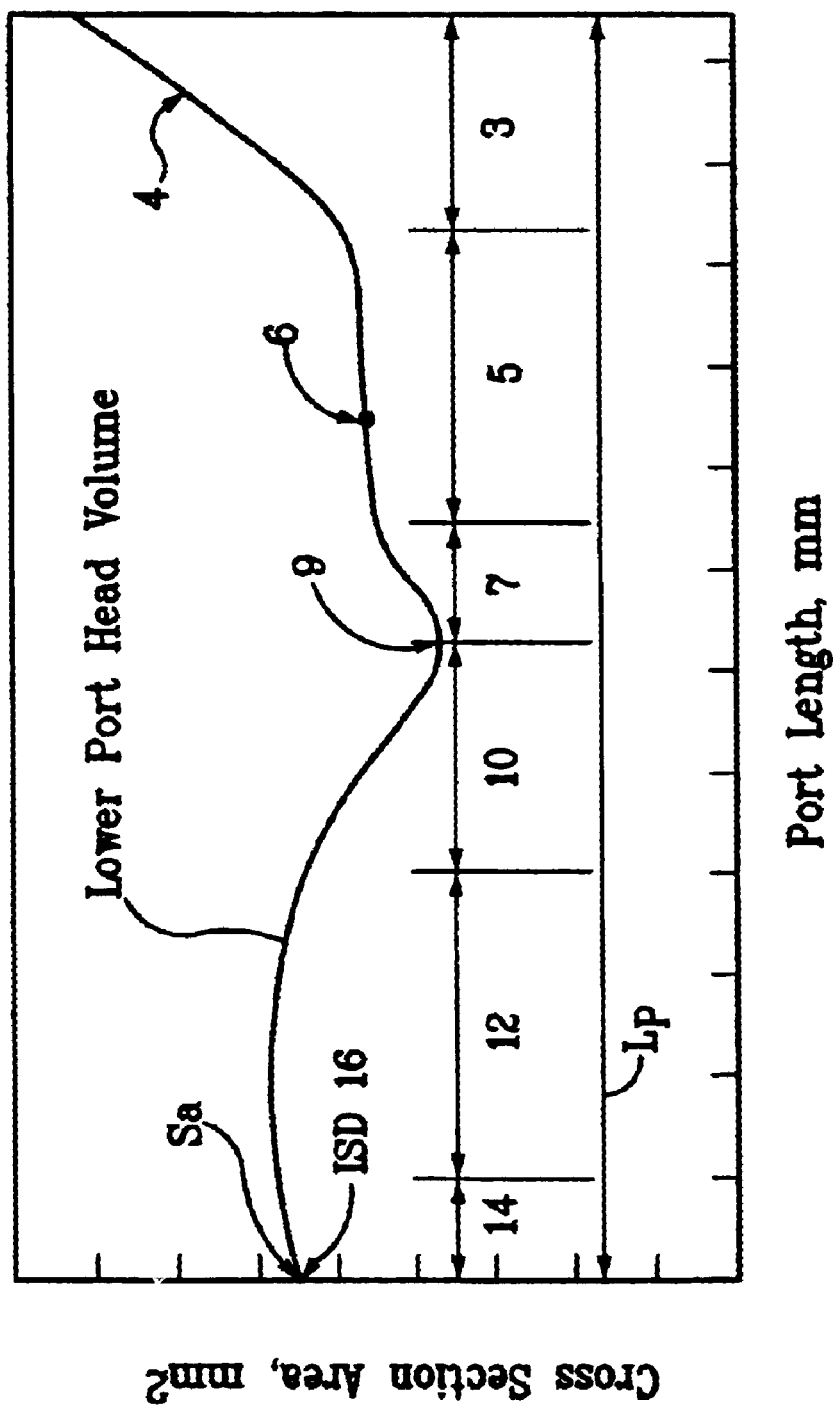
FIG. 2 is a chart showing intake port cross-section area vs. port length according to the present invention.

FIG. 2 is int ended to illustrate the cross section area of the port through its length, where port length is shown on the horizontal axis of FIG. 2, and port cross section area is shown on the vertical axis of FIG. 2 for an intake port according to the present invention. The port section reference numbers described with relation to FIG. 1 are shown in FIG. 2.

Figure 3:
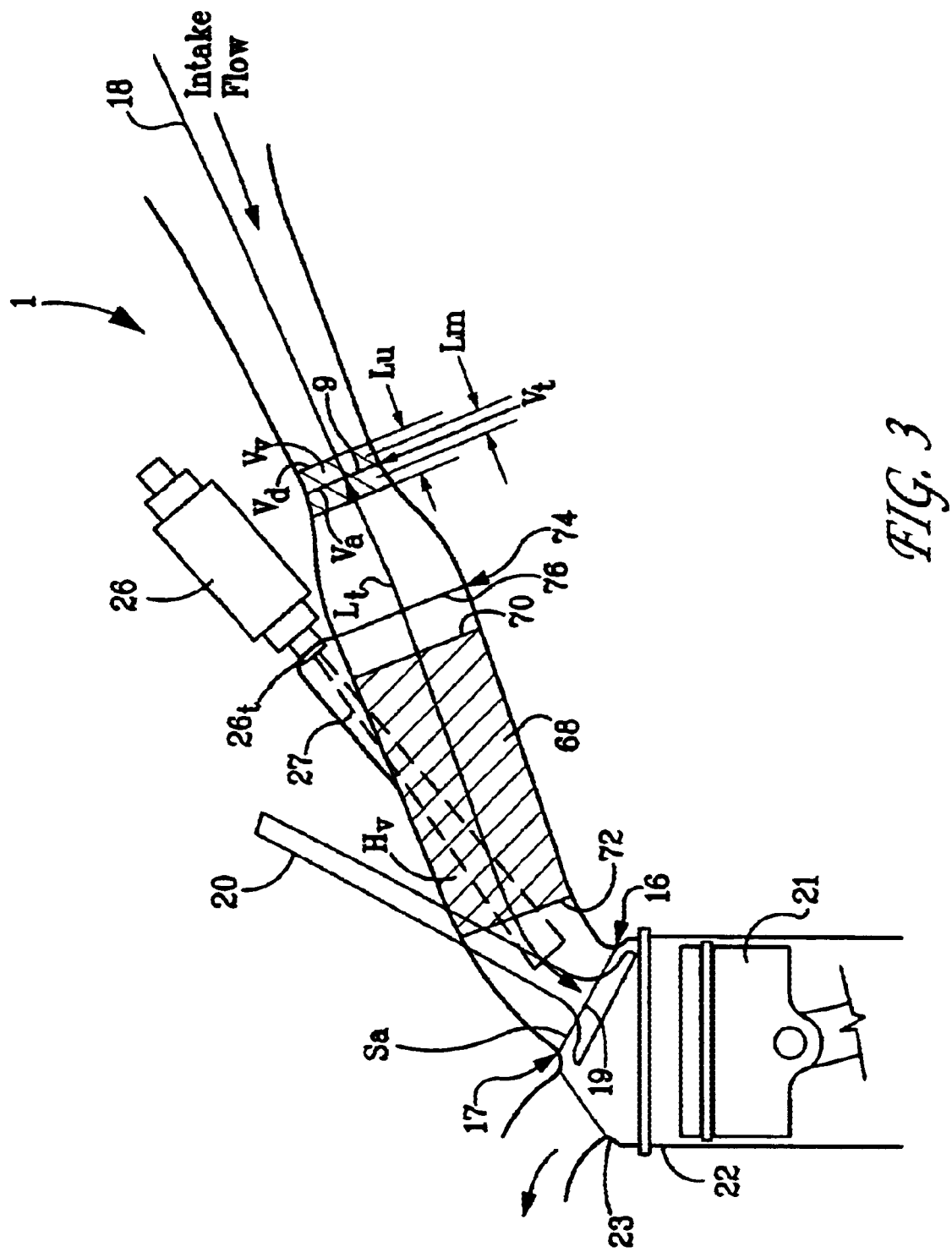
FIG. 3 is similar to FIG. 1 and provides greater detail on the specifications of the port according to the present invention.

FIG. 3 is a detailed view of an in take port according to the present invention. Inner seat diameter 16 is the smallest diameter that intake valve 20 comes into contact with. Each inner seat diameter 16 has an inner valve seat cross-section area Sa. Intake port 1 has a total outlet area 17 equal to the sum of the inner valve seat cross section areas Sa for all of the intake valves 20 in fluid communication with intake port 1. Intake port 1 has an equivalent outlet diameter 19 being equal to the square root of the quantity total outlet area 17 times four divided by pi, Equivalent outlet diameter=$(4 \times \text{total outlet area}/3.14159)^{1/2}$ Intake port 1 has an overall port length Lp measured along flow centerline 18 from inner valve seat cross-section area Sa to port inlet 4. In embodiments of the present invention having more than one intake valve per cylinder, the overall port length may be longer for one valve, and in this case the overall port length Lp for the port is defined as the average overall port length for all of the valves in the port.

Intake port 1 has a tuning length Lt measured along flow centerline 18 from inner valve seat cross section area Sa to venturi throat 9 also referred to as Vt. Venturi throat Vt is the cross section of the port having the smallest cross section area of the port, excluding the port leg cross section areas near inner valve seat cross section area Sa. The minimum cross section area may extend for a length Lm of the port, and in this condition venturi throat Vt is assumed to be located at the mid point of length Lm.

In embodiments of the present invention having more than one intake valve per cylinder, the tuning length may be longer for one valve, and in this case the tuning length Lt for the port is defined as the average tuning length for all of the valves in the port.

Venturi throat Vt has a venturi cross-section area Va and an equivalent diameter Vd, Vd being equal to $Vd=(4Va/\pi)^{1/2}$ The venturi further has characteristic length or venturi length Lu having an inlet end and an outlet end, the venturi inlet end being located a distance upstream of venturi throat Vt equal to 5 percent of the tuning length Lt, and the venturi outlet end being located a distance downstream of venturi throat Vt equal to 5 percent of the tuning length Lt. In more detail, venturi length Lu is 10% of the tuning length Lt, and the mid point of venturi length Lu is centered on venturi throat Vt so that half of venturi length Lu extends upstream of venturi throat Vt and half of venturi length Lu extends down stream of venturi throat Vt. The venturi further has a characteristic volume or venturi volume Vv defined as the volume of the port within the venturi length Lu, and in more detail within the cross sections located at both ends of venturi length Lu, the cross sections being perpendicular to the centerline of the port flow stream centerline 18.

Intake port 1 further has a surge chamber 68 having a surge chamber inlet end 70 and a surge chamber outlet end 72, the surge chamber inlet end 70 being located a distance downstream of venturi throat Vt equal to 30 percent of the tuning length Lt, that is the surge chamber inlet 70 is located 30 percent of the tuning length Lt downstream of venturi throat Vt, and the surge chamber outlet end 72 is located a distance upstream of inner valve seat cross section area Sa equal to 20 percent of the tuning length Lt, that is surger chamber outlet 72 is located 20 percent of the tuning length Lt upstream of in ner valve seat cross section area Sa. Surge chamber 68 has a surge chamber volume within intake port 1 and between surge chamber inlet end 70 and surge chamber outlet end 72.

Intake port 1 has a ratio of venturi cross-section area Va to total outlet area 17. In the preferred embodiment of the present invention, the ratio of venturi cross-section area Va to total outlet area 17 is no more than 0.87. Additionally, according to the present invention the volume of surge chamber 68 is greater than the product of total outlet area 17 times 0.26 times tuning length Lt. Additionally, according to the present invention, venturi volume Vv is less than the product of total outlet area times 0.09 times the tuning length Lt. Accordingly, the port has a large surge chamber and a small venturi for providing a high volumetric efficiency for the engine.

Several parameters are required to define the intake port according to the present invention. Some or all of the variables may be optimized within the spirit and scope of the present invention. Preferably tuning length Lt is greater than 115 millimeters. A tuning length of 115 millimeters provides generally good performance for a broad range of automotive size engines. Intake port 1 further has a ratio of tuning length Lt to equivalent outlet diameter 19. Preferably the ratio of tuning length Lt to equivalent outlet diameter 19 is at least 2.4 in order to provide good performance for a broad range of automotive size engines. Intake port 1 further has a ratio of surge chamber volume 68 to venturi volume Vv. Preferably the ratio of surge chamber volume 68 to venturi volume Vv is at least 4.6 but no more than 8.0 in order to provide a large surge chamber volume, but not too large a surge chamber volume, as too large a volume can cause the flow to stall in some embodiments of the present invention. Intake port 1 further has a ratio of tuning length Lt to overall port length Lp. Preferably the ratio of tuning length Lt to overall port length Lp is at least 0.325. Intake port 1 further has a ratio of venturi cross-section area Va to cylinder displacement Dc. Preferably the ratio of venturi cross section area to cylinder displacement is no more than 0.0022 square millimeters of venturi cross section area per cubic millimeter of cylinder displacement in order to provide a small venturi cross section area for high speed flow and a large surge chamber volume for blow down of intake air or another fluid into the working cylinder of the engine.

The present invention provides an exceptionally high degree of diffusion between the venturi throat Vt and surge chamber volume 68. Fuel injector 26 injects fuel into port 1 through an injector pocket 27. Injector pocket 27 can disrupt diffusion of the flow between venturi throat Vt and surge chamber volume 68. According to the present invention, venturi throat Vt is moved upstream and/or injector pocket 27 is moved downstream so that a large degree of diffusion can be completed before the injector pocket disrupts the flow. Fuel injector 26 includes an injector tip 26t and intake port 1 includes an injector tip port section 74 that passes through injector tip 26t, injector tip port section 74 having an injector port cross section area 76. Preferably, according to the present invention, the injector tip port cross section area 76 is greater than the sum of 0.75 times venturi cross section area Va plus 0.25 times total outlet area 17.

As stated earlier, some or all of the port specifications may be optimized within the spirit and scope of the present invention to provide a high performance port for a broad range of automotive applications. Preferably, according to the present invention, the ratio of venturi cross section area Va to total outlet area 17 is no more than 0.87; the volume of surge chamber 68 is greater than the product of total outlet area 17 times 0.26 times tuning length Lt; venturi volume Vv is less than the product of total outlet area times 0.09 times the tuning length Lt; tuning length Lt is greater than 115 millimeters; the ratio of surge chamber volume 68 to venturi volume Vv is at least 4.6; and the ratio of venturi cross section area to cylinder displacement is no more than 0.0022 square millimeters of venturi cross section area per cubic millimeter of cylinder displacement. Accordingly, the port provides a high flow velocity ram effect, a large lower port head volume for providing highly aerodynamic flow through the intake valve(s) into the working cylinder, and a high efficiency diffuser for converting the high-speed flow from the venturi into elevated gas pressure with minimal losses. In some embodiments of the present invention port flow can be further improved with a ratio of venturi cross section area Va to total outlet area 17 less than 0.68; plus a surge chamber volume 68 greater than the product of total outlet area 17 times 0.31 times the tuning length Lt; plus a venturi volume Vv less than the product of total outlet area 17 times 0.08 times the tuning length Lt; plus a ratio of surge chamber volume 68 to venturi volume Vv of at least 5.3. In some embodiments of the present invention, this specification can be further improved by reducing the ratio of venturi cross section area to cylinder displacement to no more than 0.0021 square millimeters of venturi cross section area per cubic millimeter of cylinder displacement, and/or increasing the tuning length Lt to at least 135 millimeters. With an increased tuning length, the injector tip port cross section area is preferably greater than the sum of 0.75 times venturi cross section area Va plus 0.25 times total outlet area 17, and the ratio of tuning length Lt to equivalent outlet diameter 19 increased to at least 3.1. In some applications of the present invention, the tuning length Lt may be further increased to 145 mm and or the ratio of venturi cross section area Va to total outlet area 17 reduced to no more than 0.625, thereby providing an exceptionally small venturi, a large diffuser, and a large surge chamber volume.

According to the present invention, an exceptionally high flow velocity through the venturi is achieved, followed by an exceptionally large amount of diffusion as the flow travels into the surge chamber volume. The flow then blows down from the large surge chamber through the intake valves into the working cylinder of the engine, providing an exceptionally high volumetric efficiency and high engine power output.

The present invention may be practiced within the spirit and scope of the claims. The present specifications have been developed for engines having two intake valves per cylinder, but are expected to also provide significant performance improvements for engines having one or three intake valves per cylinder. Additionally, the specifications have been developed for engines having an individual cylinder displacement less than 600 and more than 400 cubic centimeters or cc, or 0.6 and 0.4 liters, but are expected to also provide significant performance improvements for engines having a larger or smaller displacement. Additionally, the specifications have been developed for engines having a maximum speed less than 7000 rpm, but are expected to also provide significant benefits for engines operating at higher speeds.

What is claimed is:

1. An intake port for an internal combustion engine having at least one cylinder, a piston mounted for reciprocating movement in the cylinder, said reciprocating piston in said cylinder defining a swept cylinder displacement, a cylinder head having one or more intake valves in fluid communication with said intake port, an intake valve seat for each of said one or more intake valves, each intake valve seat having an intake valve seat inner diameter for sealing contact with said valve, each of said valve seat inner diameters further having an inner valve seat cross section area, and an intake plenum, said intake port for an internal combustion engine having an inlet end and an outlet end, said inlet end being in fluid communication with said plenum and said outlet end being in fluid communication with said intake valve for flow of intake air or another fluid from said plenum through said intake port into said cylinder, wherein said intake port has a total outlet area, said total outlet area being equal to the sum of the inner valve seat cross section areas for the one or more intake valves in fluid communication with said intake port, and said intake port has an equivalent outlet diameter, said equivalent outlet diameter being equal to the square rout of the quantity total outlet area times four divided by pi, wherein said cylinder head has two intake valves in fluid communication with said intake port, wherein said intake port includes a ram tuning pipe, a venturi having a throat and a venturi cross section area, said venturi cross section area being measured at said throat, a surge chamber, an outlet nozzle, wherein the intake port has a ratio of venturi cross section area to total outlet area, said ratio of venturi cross section area to total outlet area being no more than 0.87, wherein the intake port has a tuning length, said tuning length being the average distance between the throat and the one or more intake valve seat inner diameters, wherein said surge chamber has a surge chamber inlet end and a surge chamber outlet end, said surge chamber inlet end being located 30 percent of the tuning length downstream of said throat, and said surge chamber outlet being located 20 percent of the tuning length upstream of said intake valve inner seat diameter, said surge chamber further having a volume within said intake port and between said surge chamber inlet end and said surge chamber outlet end, wherein the surge chamber volume is greater than the product of total outlet area times 0.26 times the tuning length, wherein said venturi has a venturi inlet end and a venturi outlet end, said venturi inlet end being located 5 percent of the tuning length upstream of said throat, and said venturi outlet being located 5 percent of the tuning length downstream of said throat, said venturi further having a venturi volume within said intake port and between said venturi inlet end and said venturi outlet end, wherein the venturi volume is less than the product of total outlet area times 0.09 times the tuning length, thereby providing an intake port with a high flow coefficient and dynamic tuning for a high volumetric efficiency.

2. The intake port for an internal combustion engine having at least one cylinder of claim 1, wherein the intake port has a tuning length greater than 115 millimeters, thereby providing a long tuning length and a large surge chamber.

3. The intake port for an internal combustion engine having at least one cylinder of claim 1, wherein the intake port has a ratio of tuning length to the equivalent outlet diameter, said ratio of tuning length to equivalent outlet diameter being at least 2.4, thereby providing a long tuning length and a large surge chamber.

4. The intake port for an internal combustion engine having at least one cylinder of claim 1, wherein the intake port has a ratio of surge chamber volume to venturi volume, said ratio of surge chamber volume to venturi volume being at least 4.6, thereby providing a large surge chamber.

5. The intake port for an internal combustion engine having at least one cylinder of claim 1, wherein the intake port has a ratio of surge chamber volume to venturi volume, said ratio of surge chamber volume to venturi volume being no more than 8.0, thereby providing a streamline port shape.

6. The intake port for an internal combustion engine having at least one cylinder of claim 1, wherein the intake port has an overall port length, said overall port length being the average distance between the plenum and the one or more intake valve seat diameters, wherein the intake port has a ratio of tuning length to overall port length, said ratio of tuning length to overall port length being at least 0.325, thereby providing a long tuning length and a large surge chamber.

7. The intake port for an internal combustion engine having at least one cylinder of claim 1, wherein said intake port has a ratio of venturi cross section area to cylinder displacement, said ratio of venturi cross section area to cylinder displacement being no more than 0.0022 square millimeters of venturi cross section area per cubic millimeter of cylinder displacement, thereby providing a small venturi nozzle cross-section area a nd high-speed inlet flow for high power output from the engine.

8. The intake port for an internal combustion engine having at least one cylinder of claim 1, further including a fuel injector having a fuel injector tip, and an injector tip port section in said intake port having a injector tip port cross section area, said injector tip port cross section area be ing greater than the sum of 0.75 time said venturi cross section area plus 0.25 times said total outlet area, thereby providing a large degree of diffusion upstream of the injector tip.

9. The intake port for an internal combustion engine having at least one cylinder of claim 1, wherein the in take port has a tuning length greater than 115 millimeters, wherein the intake port has a ratio of surge chamber volume to venturi volume, said ratio of surge chamber volume to venturi volume being at least 4.6, wherein said intake port has a ratio of venturi cross section area to cylinder displacement, said ratio of venturi cross section area to cylinder displacement being no more than 0.0022 square millimeters of venturi cross section area per cubic millimeter of cylinder displacement, thereby providing a large surge chamber and a small venturi nozzle cross-section area for high-speed flow and a high power output from the engine.

10. The intake port for an internal combustion engine having at least one cylinder of claim 1, wherein the intake port has a ratio of venturi cross section area to total outlet area, said ratio of venturi cross section area to total outlet area being no more than 0.68, wherein the surge chamber volume is greater than the product of total outlet area times 0.31 times the tuning length, wherein the venturi volume is less than the product of total outlet area times 0.08 times the tuning length, wherein the intake port has a ratio of surge chamber volume to venturi volume, said ratio of surge chamber volume to venturi volume being at least 5.3, thereby providing a large surge chamber and a small venturi volume for a high port flow velocity and a high volumetric efficiency.

11. The intake port for an internal combustion engine having at least one cylinder of claim 10, wherein said intake port has a ratio of venturi cross section area to cylinder displacement, said ratio of venturi cross section area to cylinder displacement being no more than 0.0021 square millimeters of venturi cross section area per cubic millimeter of cylinder displacement, thereby providing a small venturi nozzle cross-section area and high-speed inlet flow for high power output from the engine.

12. The intake port for an internal combustion engine having at least one cylinder of claim 11, wherein the intake port has a tuning length greater than 135 millimeters, thereby providing a long tuning length for an aerodynamic diffuser.

13. The intake port for an internal combustion engine having at least one cylinder of claim 12, further including a fuel injector having a fuel injector tip, and an injector tip port section in said intake port having a injector tip port cross section area, said injector tip port cross section area being greater than the sum of 0.75 times said venturi cross section area plus 0.25 times said total outlet area, wherein the intake port has a ratio of tuning length to the equivalent outlet diameter, said ratio of tuning length to equivalent outlet diameter being at least 3.1, thereby providing a long tuning length and a large surge chamber, and a large degree of diffusion upstream of the injector tip.

14. The intake port for an internal combustion engine having at least one cylinder of claim 13, wherein the intake port has a tuning length greater than 145 millimeters, thereby providing a long tuning length for an aerodynamic diffuser.

15. The intake port for an internal combustion engine having at least one cylinder of claim 11, wherein the intake port has a tuning length greater than 145 millimeters, thereby providing a long tuning length for an aerodynamic diffuser.

16. The intake port for an internal combustion engine having at least one cylinder of claim 15, wherein the intake port has a ratio of venturi cross section area to total outlet area, said ratio of venturi cross section area to total outlet area being no more than 0.625, thereby providing a small venturi cross-section area for very high-speed pulsating flow, and a long tuning length for an aerodynamic diffuser.

17. The intake port for an internal combustion engine having at least one cylinder of claim 16, further including a fuel injector having a fuel injector tip, and an injector tip port section in said intake port having a injector tip port cross section area, said injector tip port cross section area being greater than the sum of 0.75 times said venturi cross section area plus 0.25 times said total outlet area, wherein the intake port has a ratio of surge chamber volume to venturi volume, said ratio of surge chamber volume to venturi volume being no more than 8.0, wherein the intake port has a ratio of tuning length to overall port length, said ratio of tuning length to overall port length being at least 0.325, wherein the intake port has a ratio of tuning length to the equivalent outlet diameter, said ratio of tuning length to equivalent outlet diameter being at least 3.1, thereby providing a streamline intake port having a long tuning length and a large surge chamber.

18. The intake port for an internal combustion engine having at least one cylinder of claim 17, wherein the engine has a maximum speed less than 7000 rpm, and a cylinder displacement between 600 and 400 cubic centimeters per cylinder.

19. An intake port for an internal combustion engine having at least one cylinder, a piston mounted for reciprocating movement in the cylinder, said reciprocating piston in said cylinder defining a swept cylinder displacement, a cylinder head having one or more intake valves in fluid communication with said intake port, an intake valve seat for each of said one or more intake valves, each intake valve seat having an intake valve seat inner diameter for sealing contact with said valve, each of said valve seat inner diameters further having an inner valve seat cross section area, and an intake plenum, said intake port for an internal combustion engine having an inlet end and an outlet end, said inlet end being in fluid communication with said plenum and said outlet end being in fluid communication with said intake valve for flow of intake air or another fluid from said plenum through said intake port into said cylinder, wherein said intake port has a total outlet area, said total outlet area being equal to the sum of the inner valve seat cross section areas for the one or more intake valves in fluid communication with said intake port, and said intake port has an equivalent outlet diameter, said equivalent outlet diameter being equal to the square root of the quantity total outlet area times four divided by pi, wherein said intake port includes a ram tuning pipe, a venturi having a throat and a venturi cross section area, said venturi cross section area being measured at said throat, a surge chamber, an outlet nozzle, wherein the intake port has a ratio of venturi cross section area to total outlet area, said ratio of venturi cross section area to total outlet area being no more than 0.87, wherein the intake port has a tuning length, said tuning length being the average distance between the throat and the one or more intake valve seat inner diameters, wherein said surge chamber has a surge chamber inlet end and a surge chamber outlet end, said surge chamber inlet end being located 30 percent of the tuning length downstream of said throat, and said surge chamber outlet being located 20 percent of the tuning length upstream of said intake valve inner seat diameter, said surge chamber further having a volume within said intake port and between said surge chamber inlet end and said surge chamber outlet end, wherein the surge chamber volume is greater than the product of total outlet area times 0.26 times the tuning length, wherein said venturi has a venturi inlet end and a venturi outlet end, said venturi inlet end being located 5 percent of the tuning length upstream of said throat, and said venturi outlet being located 5 percent of the tuning length downstream of said throat, said venturi further having a venturi volume within said intake port and between said venturi inlet end and said venturi outlet end, wherein the venturi volume is less than the product of total outlet area times 0.09 times the tuning length, thereby providing an intake port with a high flow coefficient and dynamic tuning for a high volumetric efficiency.

20. The intake port for an internal combustion engine having at least one cylinder of claim 19, wherein the intake port has a ratio of venturi cross section area to total outlet area, said ratio of venturi cross section area to total outlet area being no more than 0.68, wherein the surge chamber volume is greater than the product of total outlet area times 0.31 times the tuning length, wherein the venturi volume is less than the product of total outlet area times 0.08 times the tuning length, wherein the intake port has a ratio of surge chamber volume to venturi volume, said ratio of surge chamber volume to venturi volume being at least 5.3, thereby providing a large surge chamber and a small venturi volume for a high port flow velocity and a high volumetric efficiency.

21. The intake port for an internal combustion engine having at least one cylinder of claim 20, wherein said intake port has a ratio of venturi cross section area to cylinder displacement, said ratio of venturi cross section area to cylinder displacement being no more than 0.0021 square millimeters of venturi cross section area per cubic millimeter of cylinder displacement, thereby providing a small venturi nozzle cross-section area and high-speed inlet flow for high power output from the engine.

* * * * *